(12) United States Patent
Kasuya (10) Patent No.: US 10,841,459 B2
(45) Date of Patent: Nov. 17, 2020

(54) IMAGE FORMING WITH DECOMPRESSION PROCESSING FOR BAND DATA OF FIRST AND SECOND COLOR COMPONENTS

(71) Applicant: CANON KABUSHIKI KAISHA, Tokyo (JP)

(72) Inventor: Kenji Kasuya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 15/786,946

(22) Filed: Oct. 18, 2017

(65) Prior Publication Data

US 2018/0131843 A1 May 10, 2018

(30) Foreign Application Priority Data

Nov. 9, 2016 (JP) .................. 2016-219127

(51) Int. Cl.
```
H04N 1/64      (2006.01)
G06K 15/02     (2006.01)
G06F 3/0484    (2013.01)
G06F 3/12      (2006.01)
```
(52) U.S. Cl.
CPC ......... *H04N 1/648* (2013.01); *G06F 3/04845* (2013.01); *G06K 15/1817* (2013.01); *G06K 15/1857* (2013.01); *G06K 15/1896* (2013.01); *H04N 1/64* (2013.01); *G06F 3/1297* (2013.01)

(58) Field of Classification Search
CPC ...... H04N 1/648; H04N 1/64; G06K 15/1857; G06K 15/1896; G06K 15/1817; G06F 3/04845; G06F 3/1297
See application file for complete search history.

(56) References Cited

U.S. PATENT DOCUMENTS

| | | | |
|---|---|---|---|
| 8,482,754 B2 | 7/2013 | Ikuno et al. | |
| 8,804,185 B2 | 8/2014 | Isshiki | |
| 9,651,902 B2 | 5/2017 | Yamano | |
| 2011/0188750 A1* | 8/2011 | Tamura | H04N 1/644 382/167 |
| 2012/0257253 A1* | 10/2012 | Isshiki | G06K 15/1849 358/1.16 |
| 2013/0084113 A1* | 4/2013 | Tamura | G03G 13/20 399/335 |
| 2015/0139677 A1 | 5/2015 | Yamano | |

FOREIGN PATENT DOCUMENTS

| | | |
|---|---|---|
| JP | H11-098366 A | 4/1999 |
| JP | 2005-096343 A | 4/2005 |
| JP | 2012-218317 A | 11/2012 |
| JP | 2015-121766 A | 7/2015 |
| JP | 2015-206984 A | 11/2015 |

* cited by examiner

*Primary Examiner* — Christopher Wait
(74) *Attorney, Agent, or Firm* — Venable LLP

(57) ABSTRACT

Image data stored in a spool memory and respectively corresponding to a plurality of colors is read and sequentially decompressed, and image forming processing is performed based on the decompressed image data. In the decompression, the image data respectively corresponding to the plurality of colors is sequentially decompressed, switching between decompression target data in units of bands.

16 Claims, 11 Drawing Sheets

IMAGE FORMING WITH DECOMPRESSION PROCESSING FOR BAND DATA OF FIRST AND SECOND COLOR COMPONENTS

BACKGROUND OF THE INVENTION

Field of the Invention

The present invention relates to an image forming apparatus for performing an image forming process, an image forming method, and a storage medium storing a program.

Description of the Related Art

In image forming apparatuses such as printers and copying machines, data for print output that is generated based on input data is first compressed and temporarily stored in a memory or the like, and then at the time of the print output, the compressed data is decompressed and image formation is performed based on the decompressed image data. Such image forming apparatuses are equipped with a plurality of channels of compression/decompression hardware resources in order to satisfy required data input and output performance. For example, a color printer that compresses and temporarily saves image data of a CMYK (cyan, magenta, yellow, black) color space to which halftone processing is applied is equipped with compression/decompression hardware resources in which at least eight channels can simultaneously operate. By such a configuration, a real-time capability of simultaneous operation of compression/decompression processing of the four colors of CMYK is guaranteed.

An image forming apparatus that is equipped with compression/decompression hardware resources of a plurality of channels shortens the time required for compression/decompression processing of image data by effectively using available compression/decompression hardware resources. For example, Japanese Patent Laid-Open No. H11-98366 recites a digital multi-function device that shortens the time required for encoding/decoding processing by performing the encoding/decoding processing on the same image data by using a plurality of JBIG encoding/decoding apparatuses.

However, in Japanese Patent Laid-Open No. H11-98366, there is no mention of a case in which the number of encoding/decoding apparatuses that the image forming apparatus is equipped with does not satisfy the total number of encoding/decoding processes simultaneously operating on the image forming apparatus.

For example, by an addition of functions or the like, there are cases in which the total number of compression/decompression processes simultaneously operating on the image forming apparatus exceeds the number of the compression/decompression hardware resources that the image forming apparatus is equipped with. In such cases, in a configuration in which the compression/decompression hardware resources are used exclusively by any one of the processes that are simultaneously operating, this leads to a reduction in print processing efficiency and causes a product specification restriction. Also, when the number of the compression/decompression hardware resources is increased by altering controller hardware of the image forming apparatus, this leads to an increase of the product cost.

SUMMARY OF THE INVENTION

An aspect of the present invention is to eliminate the above-mentioned problems with the conventional technology. The present invention provides an image forming apparatus, an image forming method, and a storage medium storing a program for improving efficiency of decompression processing on compressed image data corresponding to a plurality of colors.

The present invention in one aspect provides an image forming apparatus, comprising: a spool memory configured to store compressed image data corresponding to each of a plurality of printing material colors used in image forming processing; a first decompression unit configured to read and sequentially decompress image data stored in the spool memory and respectively corresponding to the plurality of colors; and an image forming unit configured to perform the image forming processing based on the image data decompressed by the first decompression unit, wherein the first decompression unit sequentially decompresses the image data respectively corresponding to the plurality of colors, switching between decompression target data in units of bands.

By virtue of the present invention, it is possible to improve efficiency of decompression processing on compressed image data corresponding to a plurality of colors.

Further features of the present invention will become apparent from the following description of exemplary embodiments with reference to the attached drawings.

DESCRIPTION OF THE EMBODIMENTS

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

Figure 1:
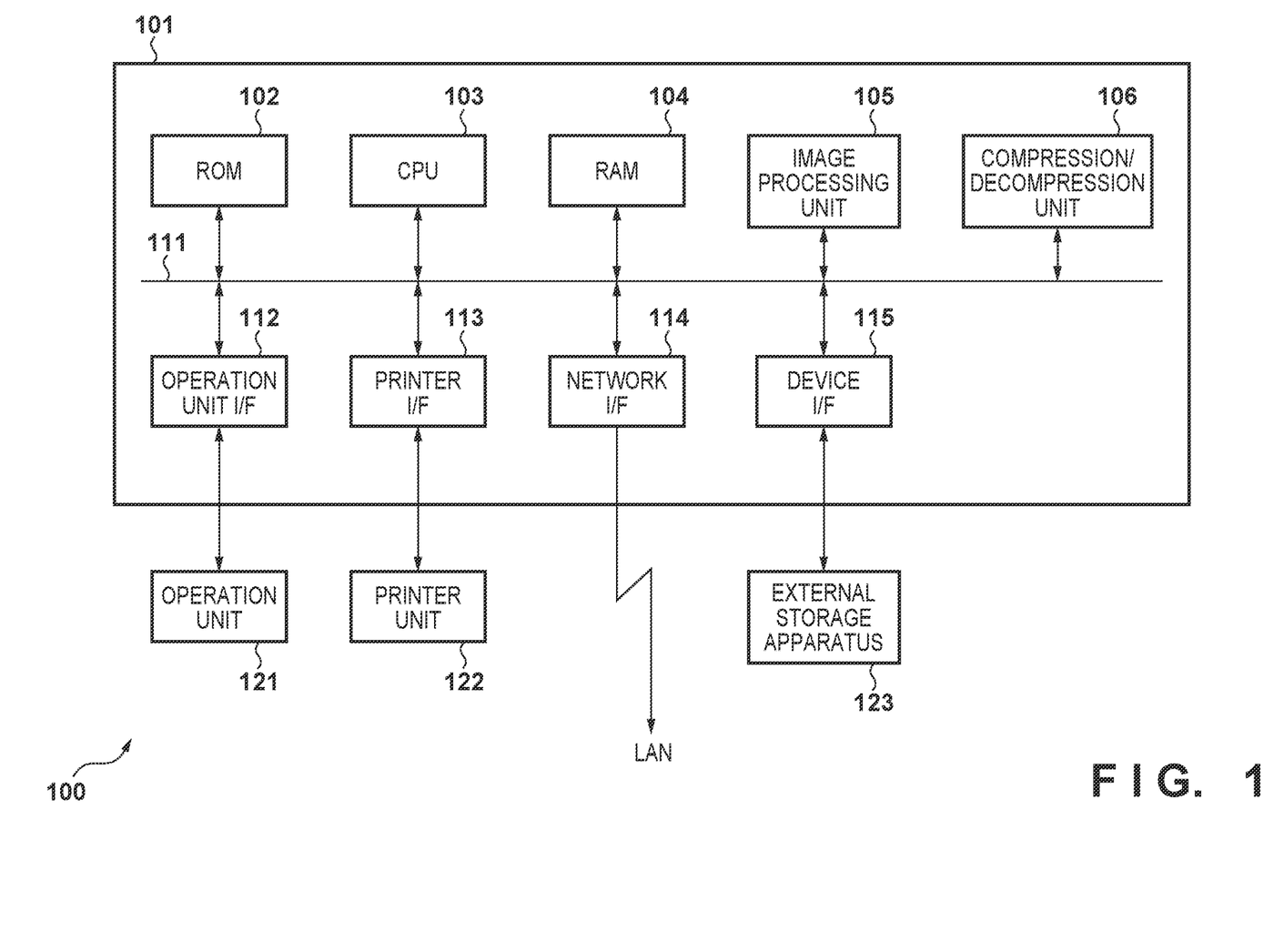
FIG. 1 is a view illustrating a system configuration of an image forming apparatus.

FIG. 1 is a view illustrating a system configuration of an image forming apparatus in the present embodiment. The image forming apparatus is a so-called multi-functional printer (MFP) in which a plurality of functions such as a copy function and a facsimile function are integrated for example. In the present embodiment, the image forming apparatus using an electrophotographic method as a printing method is described.

An image forming apparatus 100 includes a controller 101 and external modules. The external modules are an operation unit 121, a printer unit 122, and an external storage apparatus 123 for example. The controller 101 includes a ROM 102, a CPU 103, a RAM 104, an image processing unit 105, and a compression/decompression unit 106. The CPU 103 is a central processing unit (processor) for performing control of the whole apparatus, arithmetic processing, and the like, and executes each function of the image forming apparatus 100 by reading a program stored in the ROM 102 into the RAM 104 and executing it. The ROM 102 is a read-only memory, and is a storage region for storing a system boot program and programs for performing control of the printer unit 122, character data, character code information, or the like. Also, a lookup table or the like for converting a density value and a toner amount is stored in the ROM 102. The RAM 104 is a random-access memory, and is a data storage region with no use limitation. The RAM 104 is used as a storage region for font data additionally registered by download or the like, or as an execution region for programs or data of various processes. Also, the RAM 104 is used as a data storage region for received image files. The image processing unit 105 performs image processing such as gamma correction processing, density correction processing, and pseudo halftone processing on image data. The compression/decompression unit 106 performs compression processing and decompression processing of image data. In the present embodiment, JBIG, for example, is used as a compression/decompression method.

The operation unit 121 is a panel for performing display by liquid crystals or the like for example, and is used to display a setting state of the image forming apparatus 100, a current processing status of the image forming apparatus 100, an error state, or the like. Also, various user interface screens for performing a change of a print setting, a reset, or the like are displayed. The external storage apparatus 123 is a storage medium such as a hard disk, and is used for data spooling, storage of programs, information files/image data, or the like, or as a work region, for example.

The printer unit 122 controls each apparatus of a printer engine. In the present embodiment, the printer unit 122 controls each apparatus of an electrophotographic printer engine, and the printer engine includes a photosensitive drum, an exposure apparatus, a developing apparatus, and a fixing apparatus, for example. An equal amount of electrical charge is added by a charger to the surface of the photosensitive drum. The exposure unit exposes a laser beam modulated in accordance with an image signal onto the photosensitive drum, and thereby forms an electrostatic latent image. Also, the developing apparatus visualizes the electrostatic latent image by a developing agent including toner of each of C (cyan), M (magenta), Y (yellow), and K (black), for example. A visible image into which the electrostatic latent image is visualized is transferred to a printing medium such as a sheet, and the fixing apparatus performs a fixation by applying heat/pressure to the printing medium after the transfer thereto. Although description is given for the four colors of C, M, Y, and K in the present embodiment, limitation is not made to four colors, and configuration may be taken such that other colors such as special colors are included.

The controller 101 additionally includes various interfaces (I/Fs) and a system bus 111. An operation unit I/F 112 is connected to the operation unit 121, and controls data transmission/reception with the operation unit 121. A printer I/F 113 is connected to the printer unit 122, and controls data transmission/reception with the printer unit 122. A network I/F 114 connects the image forming apparatus 100 to a network such as a LAN. A device I/F 115 is connected to the external storage apparatus 123, and controls data transmission/reception with the external storage apparatus 123. The system bus 111 connects each of the configuration elements described above so that they can communicate with each other.

Figure 2:
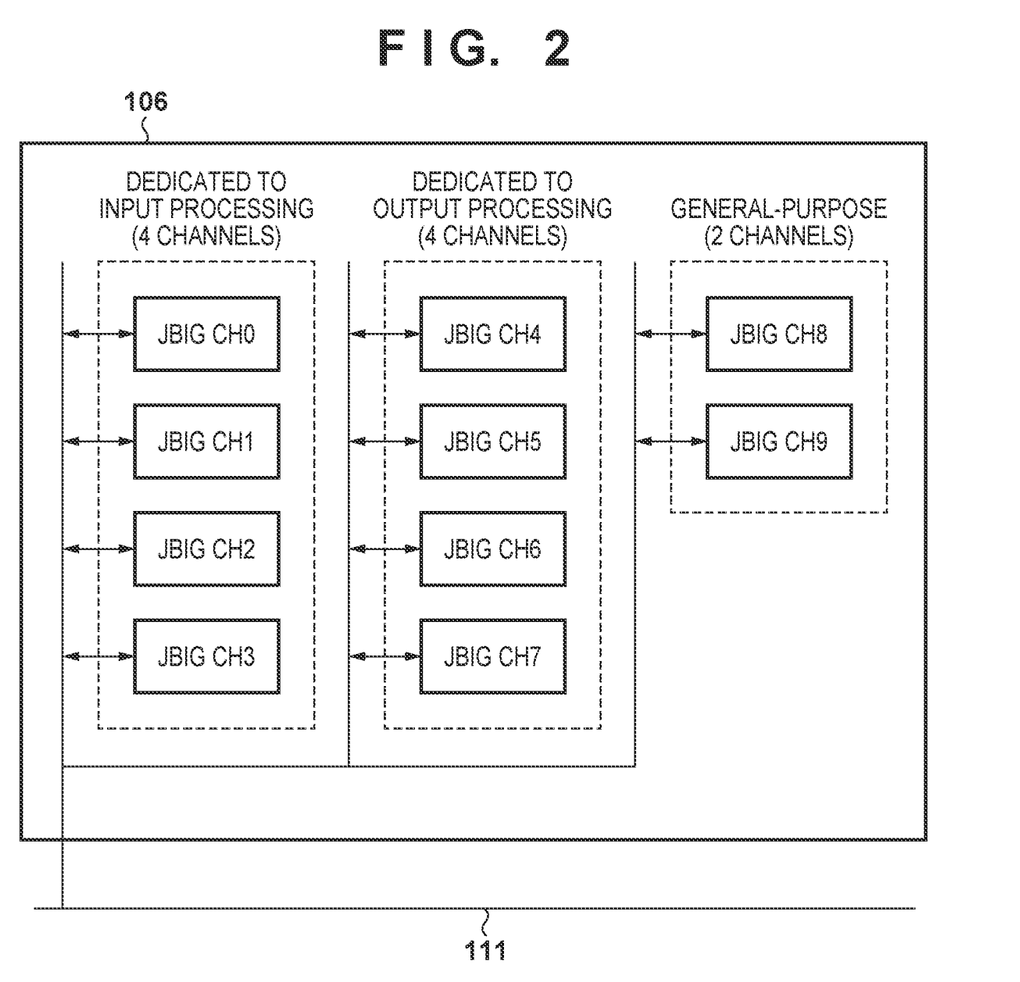
FIG. 2 is a view illustrating a configuration of a compression/decompression unit.

FIG. 2 is a view illustrating a configuration of the compression/decompression unit 106 that the controller 101 of the image forming apparatus 100 is equipped with. In the present embodiment, the compression/decompression unit 106 performs compression and decompression of image data by a JBIG format for example. Here, the compression/decompression unit 106 is configured by including independent JBIG cores of a total of 10 channels, and is configured such that respective JBIG cores are able to execute compression processing (encoding processing) or decompression processing (decoding processing) in parallel.

In the present embodiment, in a case where an image is printed, PDL data input processing is performed, and then the PDL data is compressed according to the JBIG format and temporarily spooled. Then, the compressed PDL data is read, decompressed, and outputted from the spool memory. Here, out of the 10 channels of JBIG cores of FIG. 2, a total of four channels of CH0, CH1, CH2, and CH3 are used for input processing only, and a total of four channels of CH4, CH5, CH6, and CH7 are used for output processing only. By such a configuration, simultaneous operation of four channels becomes possible.

The remaining two channels are channels for general-purpose use, and are used when a function is added to the image forming apparatus 100, for example. In the present embodiment, a fixed temperature control is executed in addition to the input processing and output processing. In the fixed temperature control, which is a control of a toner application amount for example, it is determined whether an image is a photographic image or a text image, for example, based on the amount of applied toner, and if it is a photographic image, processing to increase the fixing temperature is executed.

Figure 3:
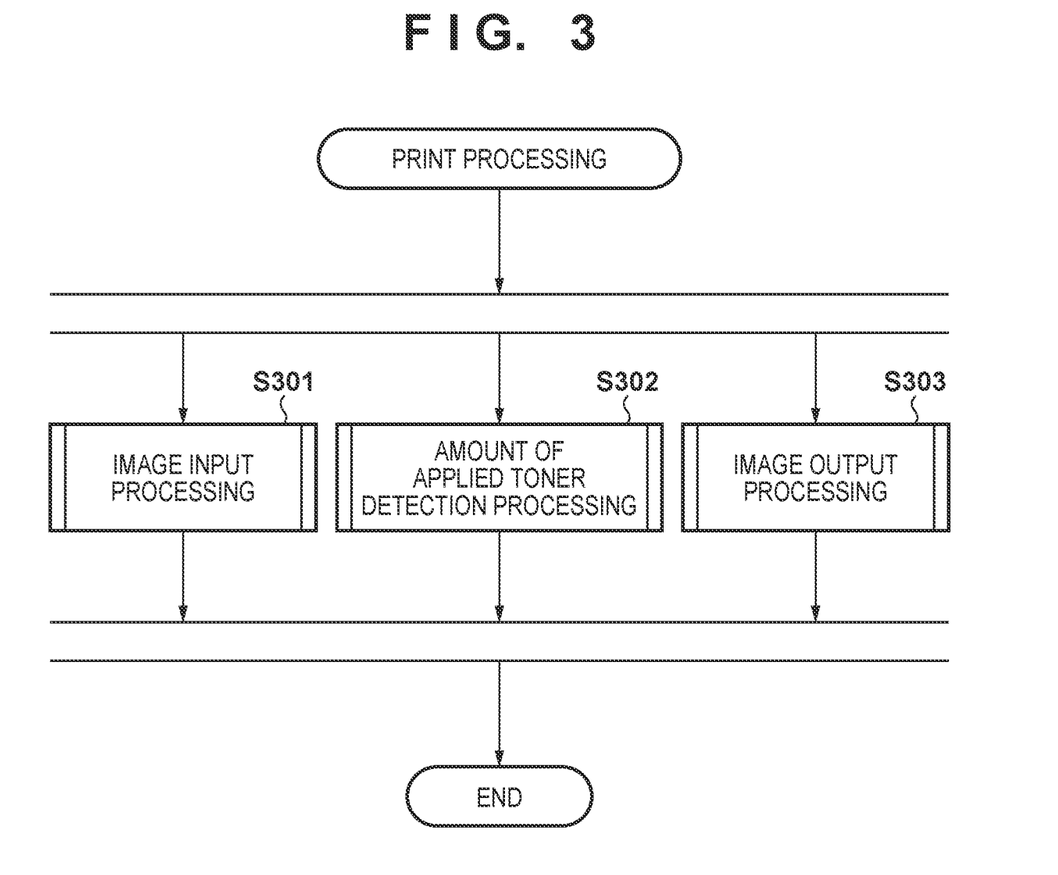
FIG. 3 is a flowchart illustrating print processing.

FIG. 3 is a flowchart illustrating an overall flow of print processing in the present embodiment. The processing of FIG. 3 is realized by the CPU 103 reading a program stored in the ROM 102 into the RAM 104 and executing it, for example. In the present embodiment, an improvement of throughput in the print processing, in which the input data is printed out, is realized by parallel processing of image input processing of step S301, amount of applied toner detection processing of step S302, and image output processing of step S303 in units of page data. In the image input processing of step S301, input of PDL data to be printed out, halftone processing, and JBIG compression (encoding) is performed in the printer unit 122. In the amount of applied toner detection processing of step S302, a calculation of the toner application amount used in the fixed temperature control of the printer unit 122 is performed. In image output processing of step S303, image data is transmitted to the printer unit 122, the fixing temperature in the printer unit 122 is adjusted, and then image formation is performed.

Hereinafter, details of the image input processing of step S301 are described with reference to FIG. 4. Also, details of the amount of applied toner detection processing of step S302 are described with reference to FIG. 5, FIG. 9, FIG. 10, and FIG. 11. Also, details of the image output processing of step S303 are described with reference to FIG. 6, FIG. 7, and FIG. 8.

Figure 4:
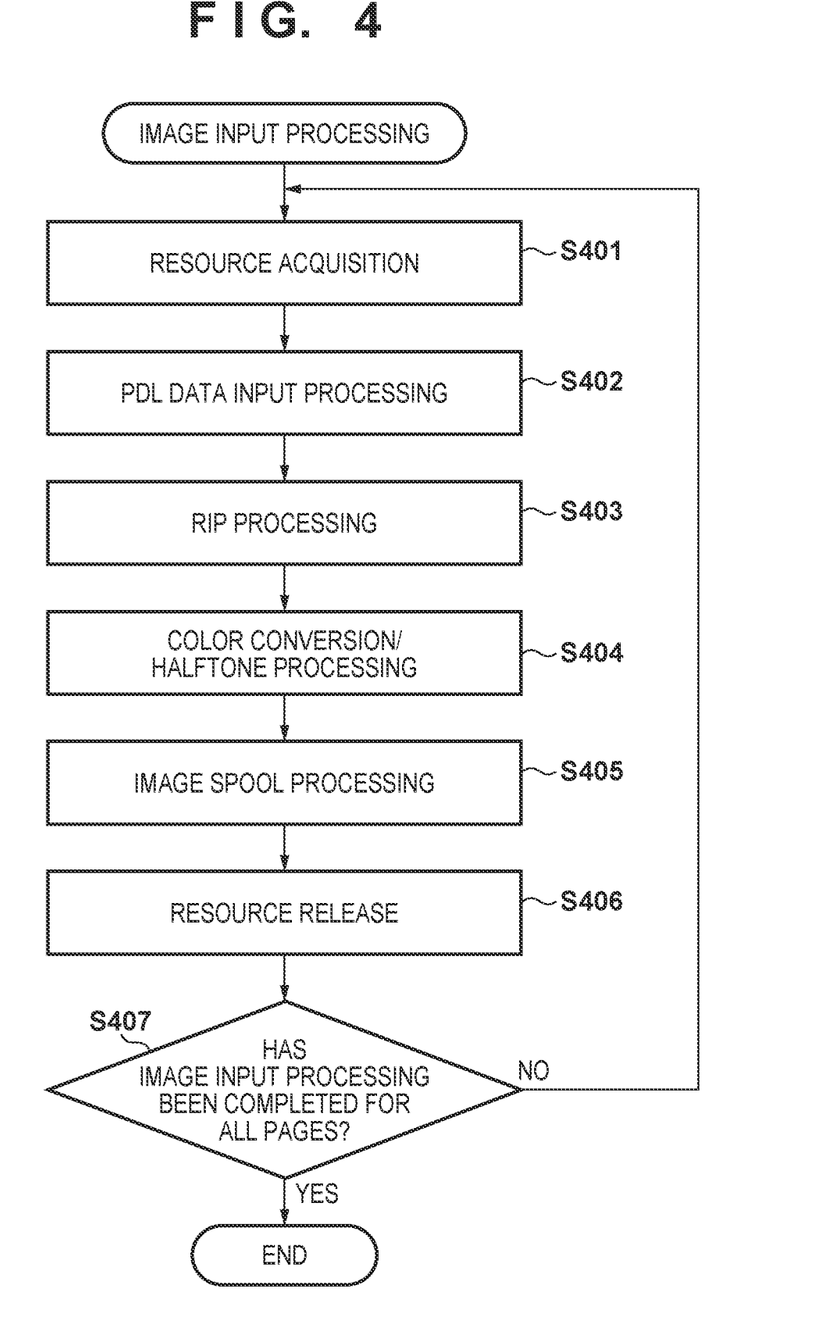
FIG. 4 is a flowchart illustrating image input processing.

FIG. 4 is a flowchart illustrating the image input processing of step S301 of FIG. 3. In step S401, the CPU 103 allocates hardware resources necessary for the image input processing. Here, the hardware resources necessary for the image input processing are the image processing unit 105 and the compression/decompression unit 106, and the four channels of JBIG cores of JBIG CH0 to CH3 of FIG. 2 are allocated in relation to the compression/decompression unit 106.

In step S402, the CPU 103 inputs PDL (page description language) data of the print output target by the printer unit 122 via the network I/F 114. In step S403, the CPU 103, by the image processing unit 105, interprets the inputted PDL data and generates RGB image data of a raster format. In step S404, the CPU 103, by the image processing unit 105, performs a color space conversion of the RGB image data to CMYK image data, and furthermore generates image data that the printer unit 122 can process by executing gamma correction processing, density correction processing, and pseudo halftone processing (halftone processing). Note, a density pattern method, an ordered dither method, an error diffusion method, or the like for example is used as a pseudo halftone processing algorithm.

In step S405, the CPU 103, by the compression/decompression unit 106, uses the 4 channels of JBIG CH0 to CH3 of the compression/decompression unit 106 to compress the CMYK image data generated in step S404 by the JBIG format for each color component of printing materials of C/M/Y/K respectively. Here, the CPU 103 generates JBIG encoded data completed in units of bands of a predetermined number of lines corresponding to each of the plurality of colors. Also, the generated JBIG encoded data of each color component is temporarily saved (spooled) to spool memory in the RAM 104. Although JBIG is used as the compression algorithm in the present embodiment, another algorithm may be used as long as it is a binarized image data compression algorithm.

In step S406, the CPU 103 releases the hardware resources allocated in step S401. In step S407, the CPU 103 determines whether or not the image input processing of FIG. 4 has been completed for all pages of PDL data. Here, in a case where it is determined that the image input processing has been completed for all pages, the image input processing of FIG. 4 finishes. Meanwhile, in a case where it is determined that the image input processing has not completed for all pages, the processing is repeated from step S401.

Figure 5:
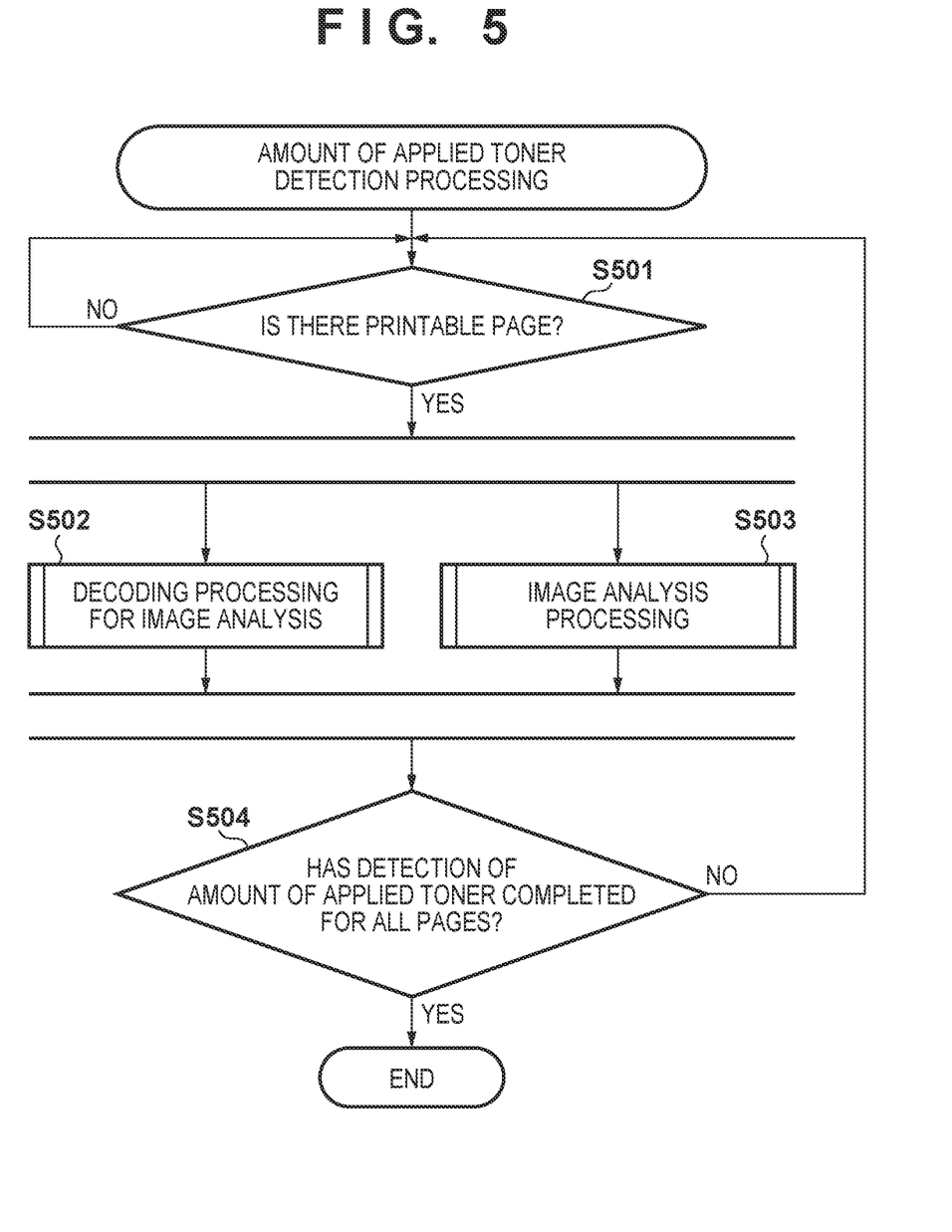
FIG. 5 is a flowchart illustrating amount of applied toner detection processing.

FIG. 5 is a flowchart illustrating the amount of applied toner detection processing of step S302 of FIG. 3. In step S501, the CPU 103 determines whether or not there is page data that was spooled to the RAM 104 by the image input processing of step S301 and for which the processing of FIG. 5 can be performed. Here, in a case where it is determined that there is page data for which the processing of FIG. 5 can be performed, decoding processing for image analysis of step S502 and image analysis processing of step S503 are executed in parallel in units of band data, and a calculation of the amount of applied toner for the page data is performed. Meanwhile, in a case where it is determined that page data for which the processing of FIG. 5 can be performed does not exist, the processing of step S501 is repeated until it is determined that page data for which the processing of FIG. 5 can be performed exists.

In step S504, the CPU 103 determines whether or not the amount of applied toner detection processing of FIG. 5 has completed for all pages. Here, in a case where it is determined that the amount of applied toner detection processing has completed for all pages, the processing of FIG. 5 finishes. Meanwhile, in a case where it is determined that the amount of applied toner detection processing has not completed for all pages, the processing is repeated from step S501. In the decoding processing for image analysis of step S502 and the image analysis processing of step S503, the processing is executed in units of bands respectively comprising a predetermined number of lines. Description is given later regarding the decoding processing for image analysis of step S502 and the image analysis processing of step S503 in FIG. 9, FIG. 10, and FIG. 11.

Figure 6:
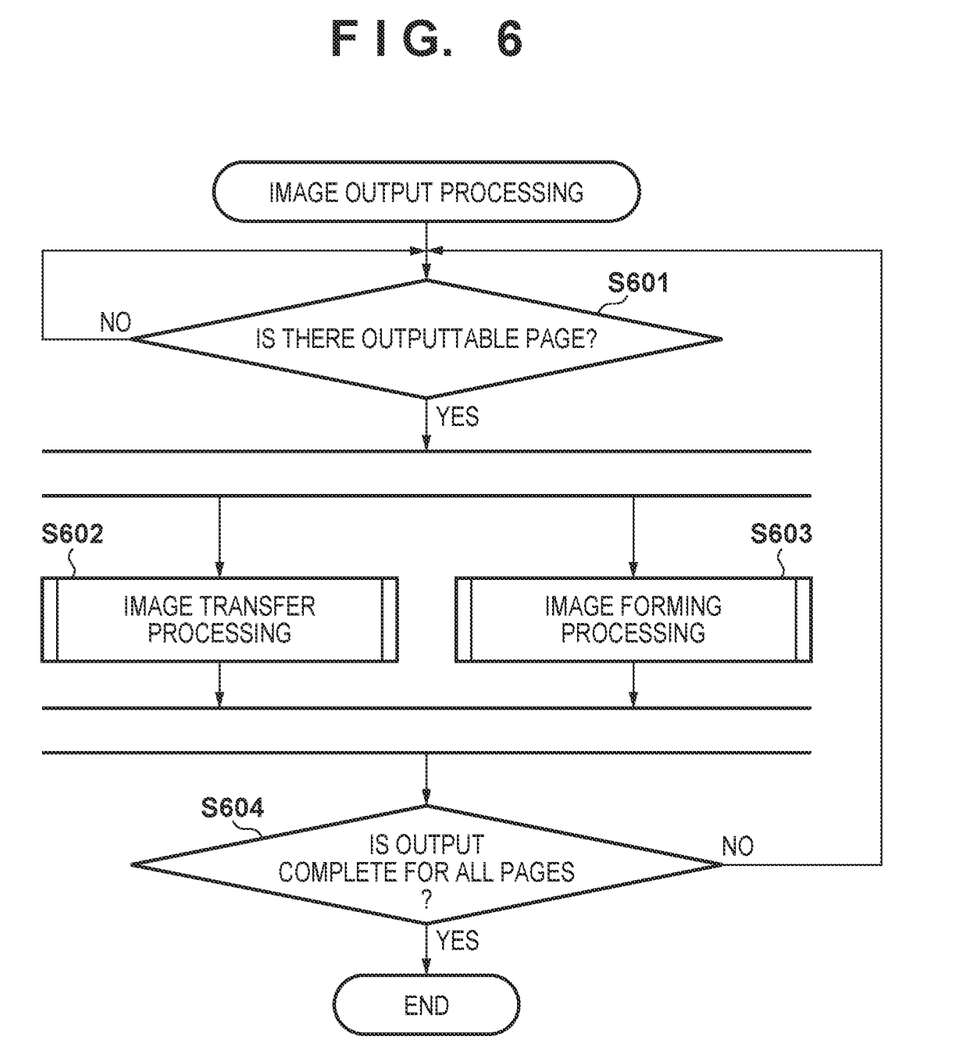
FIG. 6 is a flowchart illustrating image output processing.

FIG. 6 is a flowchart illustrating the image output processing of step S303 of FIG. 3. In step S601, the CPU 103 determines whether or not the amount of applied toner detection processing of FIG. 5 has completed and that there is page data that can be outputted to the printer unit 122. Here, in a case where it is determined that there is page data that can be outputted to the printer unit 122, a print output for the page data is performed by executing the image transfer processing of step S602 and the image forming process of step S603, in parallel in units of page data, for example. Meanwhile, in a case where it is determined that page data that can be outputted to the printer unit 122 does not exist, the processing of step S601 is repeated until it is determined that page data that can be outputted to the printer unit 122 does exist.

In step S604, the CPU 103 determines whether or not the print output for every page has completed. Here, in a case where it is determined the print output has completed for all pages, the processing of FIG. 6 finishes. Meanwhile, in a case where it is determined that the print output is not completed for all pages, the processing is repeated from step S601.

Figure 7:
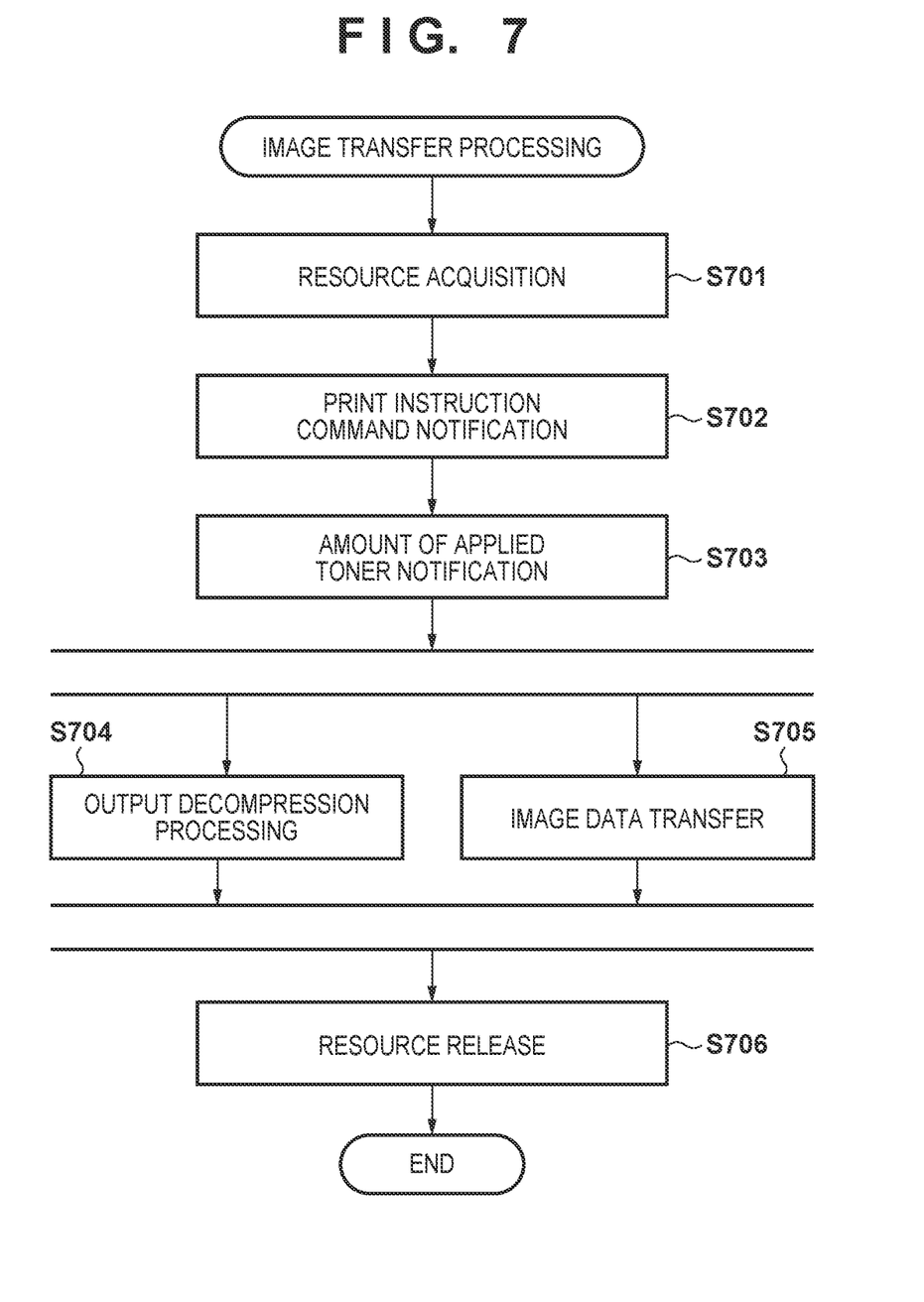
FIG. 7 is a flowchart illustrating image transfer processing.

FIG. 7 is a flowchart illustrating the image transfer processing of step S602. In step S701, the CPU 103 allocates hardware resources necessary for the image transfer processing. Here, the hardware resources necessary for the image transfer processing are the printer I/F 113 and the compression/decompression unit 106, and the four channels of JBIG cores of JBIG CH4 to CH7 of FIG. 2 are allocated in relation to the compression/decompression unit 106.

In step S702, the CPU 103 transmits a print instruction command to the printer unit 122 via the printer I/F 113. In step S703, the CPU 103 transmits the amount of applied toner for current page data of interest stored in the RAM 104 to the printer unit 122 via the printer I/F 113. The amount of applied toner has already been calculated in the processing of FIG. 5 and is stored in the RAM 104. Then, the CPU 103 receives an image transfer request from the printer unit 122 via the printer I/F 113, and reads the JBIG encoded data of the page data from the RAM 104. Then, the CPU 103 executes in parallel output decompression processing by the compression/decompression unit 106 of step S704 and an image data transfer to the printer unit 122 via the printer I/F 113 of step S705 for each color of coloring material. Then, when the image transfer of the page data is completed, in step S706, the CPU 103 releases the hardware resources allocated in step S701 and finishes the processing of FIG. 7. Note, in the output decompression processing of step S704, the four total channels of JBIG CH4 to CH7 of the compression/decompression unit 106 are used to execute in parallel decompression of the page data of the color components of C/M/Y/K respectively compressed by the JBIG format.

Figure 8:
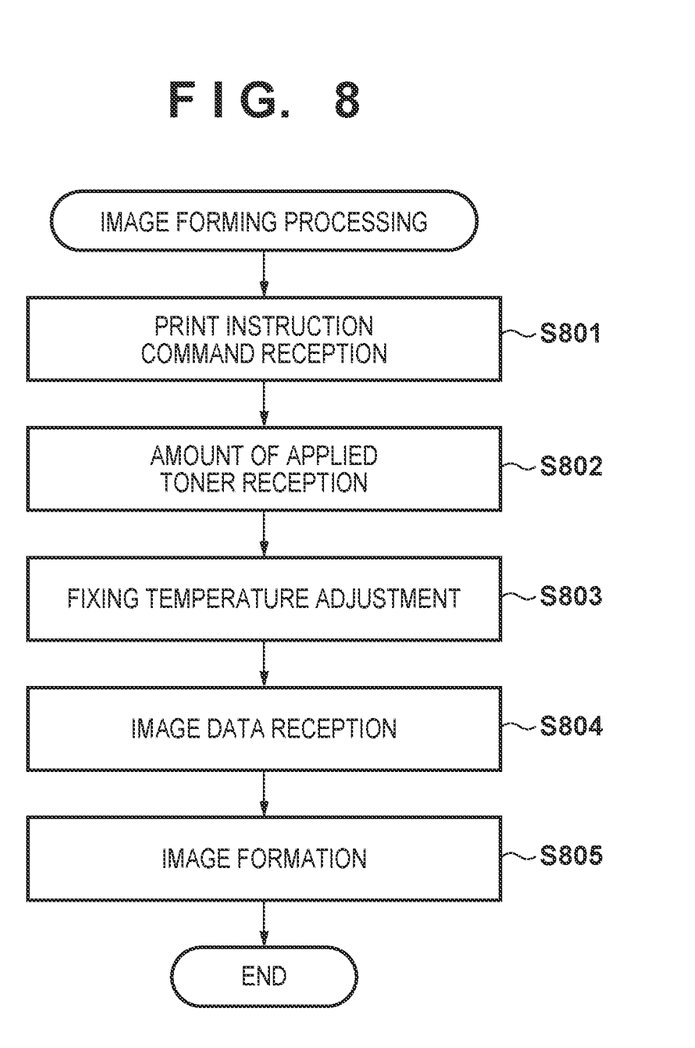
FIG. 8 is a flowchart illustrating image forming processing.

FIG. 8 is a flowchart illustrating the image forming processing of step S603. The processing of FIG. 8 is executed in the printer unit 122 in accordance with control by the CPU 103. In step S801, the printer unit 122 receives a print instruction command from the CPU 103 via the printer I/F 113. In step S802, the printer unit 122 receives the amount of applied toner from the CPU 103 via the printer I/F 113.

In step S803, the printer unit 122 performs a fixing temperature adjustment and fixing speed control of the fixing apparatus based on the received print instruction and amount of applied toner. In step S804, the printer unit 122 transmits an image transfer request to the controller 101 via the printer I/F 113 after the fixing temperature adjustment and the fixing speed control of the fixing apparatus. The CMYK image data, on which pseudo halftone processing was executed and which was transmitted from the controller 101 via the printer I/F 113 in accordance with the image transfer request, is received. In step S805, the printer unit 122 performs the image formation and sheet conveyance control to execute a print output.

As described above, the amount of applied toner detection processing of FIG. 5 is performed for the page data for which the image input processing of step S301 was performed. In the present embodiment, only two channels of JBIG cores are allocated to the amount of applied toner detection processing because eight channels of JBIG cores are allocated to the image input processing of step S301 and image output processing of step S303. Meanwhile, in the amount of applied toner detection processing, the decoding processing for image analysis is performed for page data of the four color components of CMYK. Accordingly, in the present embodiment, by performing decoding processing for image analysis in units of bands by using two channels of JBIG cores, it is possible to prevent a reduction of a throughput of print processing even in a case where the number of color components of a target of decoding processing is larger than the number of JBIG core channels.

Figure 9:
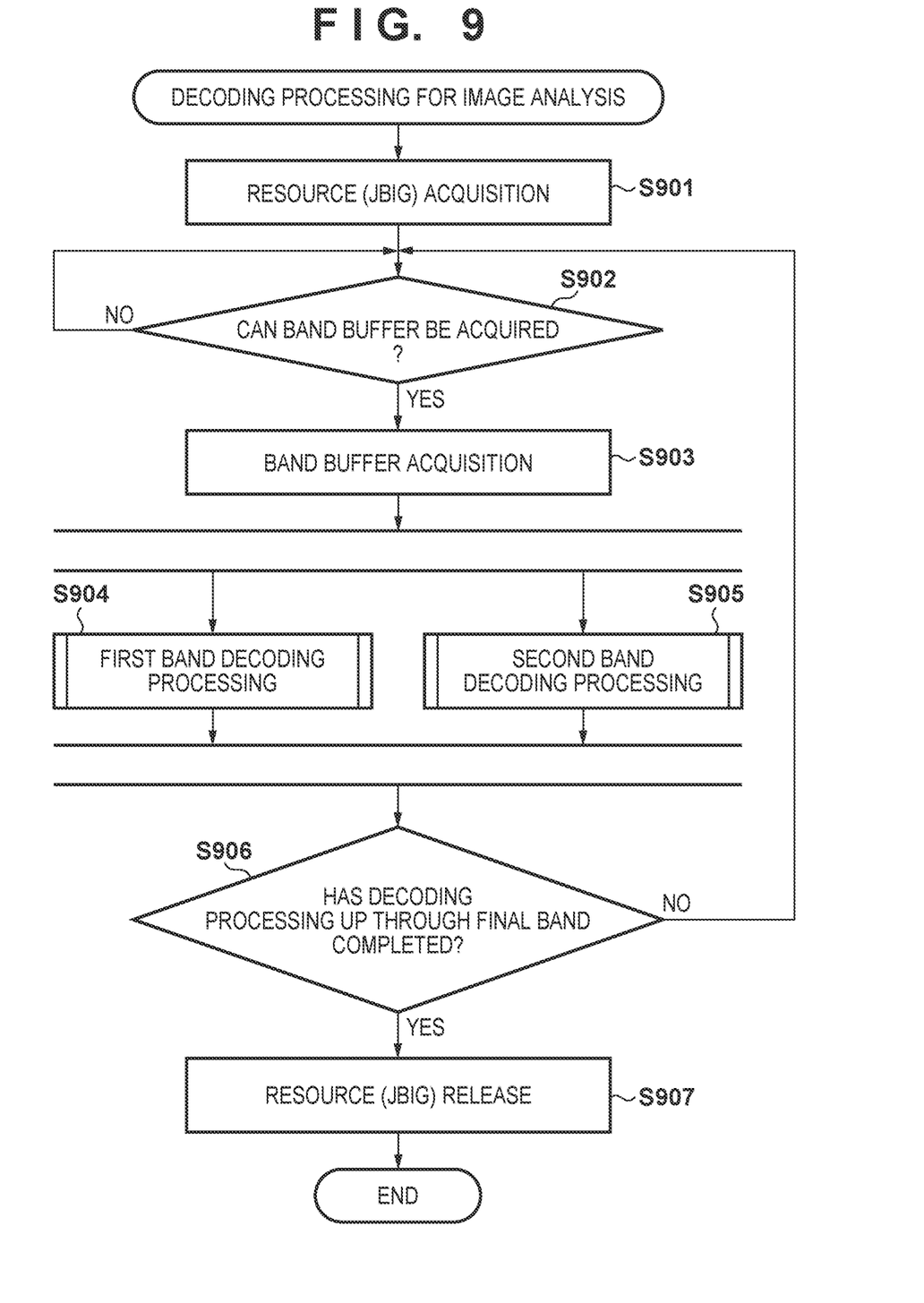
FIG. 9 is a flowchart illustrating decoding processing for image analysis.

FIG. 9 is a flowchart illustrating the decoding processing for the image analysis of step S502 of FIG. 5. In step S901, the CPU 103 allocates hardware resources necessary for the decoding processing for image analysis. Here, the hardware resource necessary for decoding processing for image analysis is the compression/decompression unit 106, and is two channels of the general-purpose JBIG cores other than the four channels of JBIG cores dedicated to input processing and four channels of JBIG core dedicated to output processing.

In step S902, the CPU 103 determines whether or not a band buffer (buffer memory) corresponding to data of one band after decompression can be allocated. Here, in a case where it is determined that the band buffer can be allocated, the CPU 103 allocates the band buffer in step S903. In case where it is determined that the band buffer cannot be allocated, the processing of step S902 is repeated until it is determined that the band buffer can be allocated.

Next, first band decoding processing of step S904 on C and M is executed in parallel with second band decoding processing of step S905 on Y and K, and decompression processing is performed for one band. In the present embodiment, the channel JBIG CH8 is used to perform decompression processing with respect to band data of a total of two color components—the Y component and the M component—in order in the first band decoding processing in step S904. Also, the channel JBIG CH9 is used to perform decompression processing with respect to band data of a total of two color components—the C component and the K component—in order in the second band decoding processing in step S905. Details of the first band decoding processing and the second band decoding processing are described later in FIG. 10.

In step S906, the CPU 103 determines whether or not the decompression processing up through the final band of the page data has completed. Here, in a case where it is determined that the decompression processing up through the final band has completed, in step S907, the CPU 103 releases the hardware resource allocated in step S901, and the processing of FIG. 9 finishes. Meanwhile, in a case where it is determined that the decompression processing has not completed up through the final band, the processing is repeated from step S902.

Figure 10:
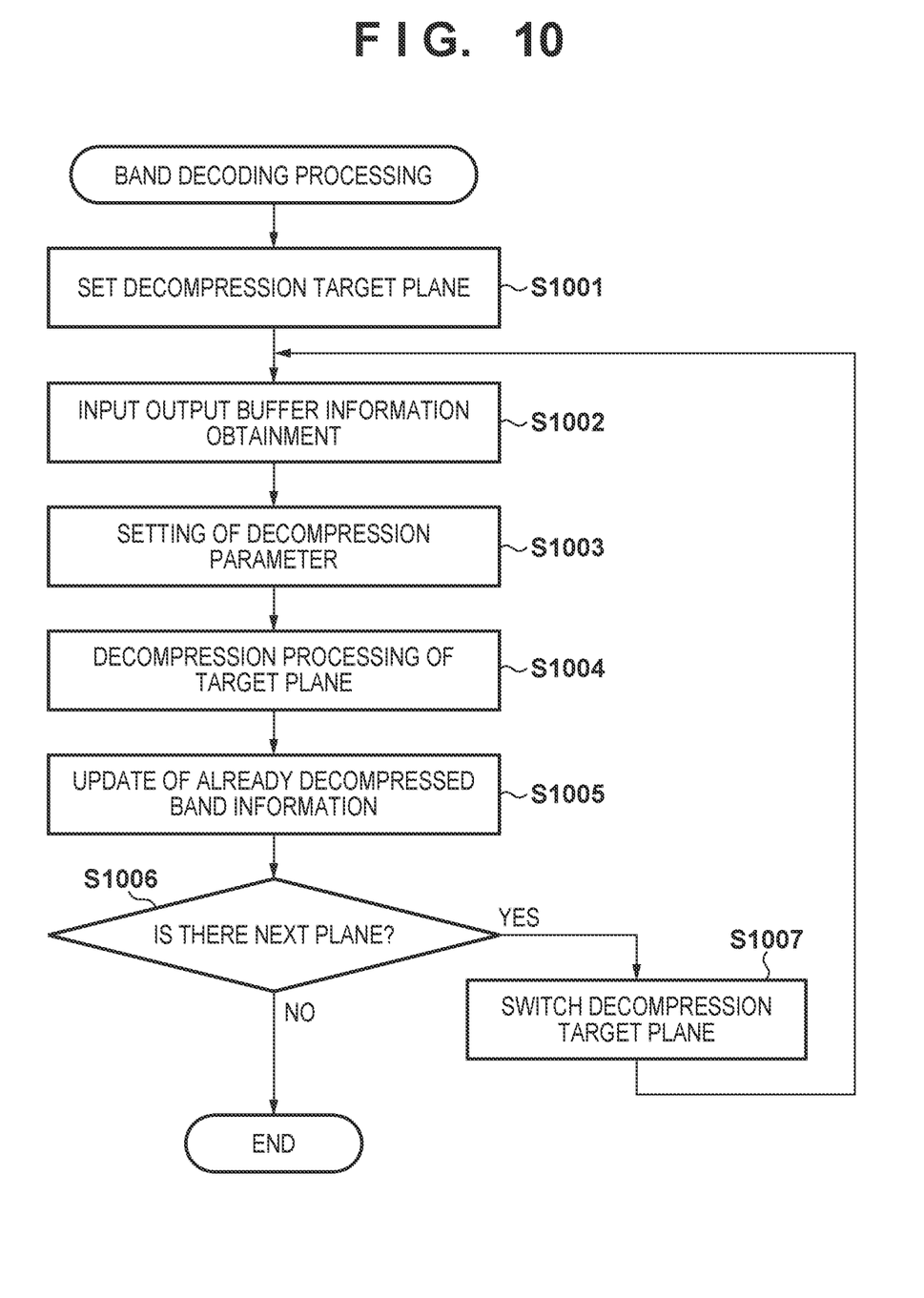
FIG. 10 is a flowchart illustrating band decoding processing.

FIG. 10 is a flowchart illustrating the first band decoding processing of step S904 and the second band decoding processing of step S905. In step S1001, the CPU 103 sets a color component (plane) which is a first color decompression target. For example, a Y component is set in a case of the first band decoding processing and a C component is set in a case of the second band decoding processing.

In step S1002, the CPU 103 obtains input/output buffer information relating to the decompression processing of the band, such as information of the beginning and final addresses of each color component in the buffer region of the band buffer. In step S1003, the CPU 103 performs a setting of a decompression (decoding) parameter for causing the decompression processing in the JBIG core to execute. Then, in step S1004, the CPU 103 causes the decompression processing of the band data of the decompression target color component to execute on the JBIG core, and stores the decompressed band data to the band buffer. In step S1005, already decompressed band information relating to the color component of the decompression target is updated. The already decompressed band information is stored in the RAM 104 or the like, and is information regarding a band on which the decompression processing has finished executing in the page data, for example.

In step S1006, the CPU 103 determines whether or not there is a color component of the next decompression target. Here, in a case where it is determined that there is no color component of the next decompression target, the processing of FIG. 10 finishes. Meanwhile, in a case where it is determined that there is a next decompression target color component, in step S1007, the CPU 103 switches the color component of the decompression target and repeats the processing from step S1002. For example, in a case of the first band decoding processing, the M component is set as the next decompression target color component in step S1007, and in a case of the second band decoding processing, the K component is set as the next decompression target color component in step S1007.

Figure 11:
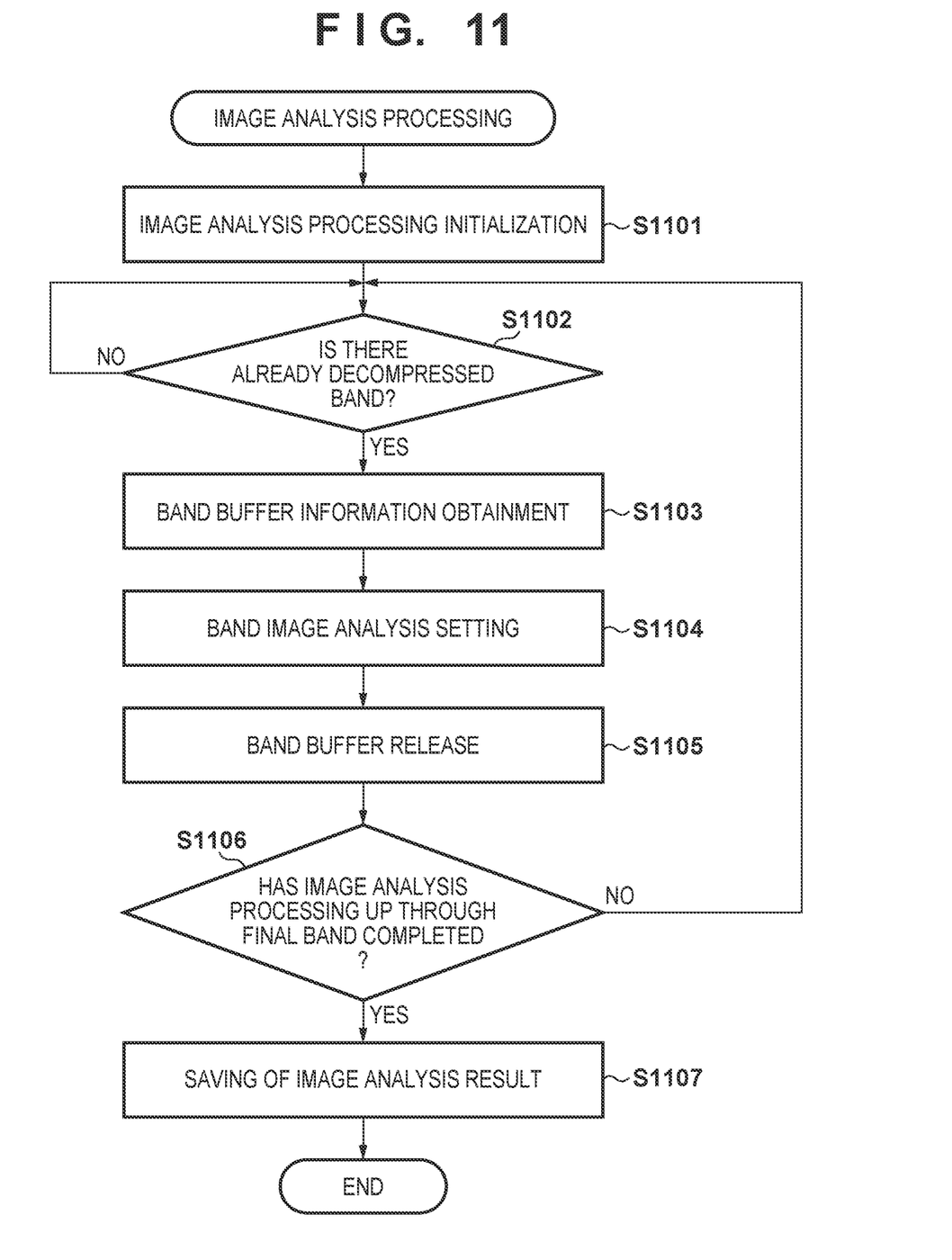
FIG. 11 is a flowchart illustrating image analysis processing.

FIG. 11 is a flowchart illustrating the image analysis processing of step S503. In step S1101, the CPU 103 performs an initialization of image analysis processing. In step S1102, the CPU 103, by referencing the band buffer allocated in step S903, determines whether or not there is band data for which band decompression processing of each of CMYK by the band decoding processing of step S904 and step S905 has completed and that is available for image analysis. Here, in a case where such band data is determined to exist, the CPU 103, in step S1103, sets band buffer information relating to the band data, and, in step S1104, performs the image analysis processing on the band data, that is, an analysis of the amount of applied toner. The analysis of the amount of applied toner, for example, uses a lookup table (LUT) in which a density value for every pixel is set for every coloring material color for conversion into a toner amount. At that time, for example, total toner amount control such as adjusting an amount of color material of another chromatic color may be performed based on the application amount of the color K (black).

The band data on which the image analysis processing has been performed is compressed by JBIG CH8 or CH9, and is stored in the RAM 104. At that time, configuration may be taken such that JBIG CH8 and CH9 are used alternatingly for each band and an available channel is used when analysis finishes. After the image analysis processing on the band data, the band buffer for the band data is released in step S1105.

In step S1106, the CPU 103 determines whether or not the image analysis processing has completed up through the final band of the page data. In a case where it is determined that the image analysis processing has completed up through the final band, in step S1107, the CPU 103 saves the page data image analysis result (analysis of the amount of applied toner result) to the RAM 104, and finishes the processing of FIG. 11. Meanwhile, in a case in which it is determined that the image analysis processing has not completed up through the final band, the processing is repeated from step S1102.

Although a case in which there are two general-purpose JBIG core channels is described in the present embodiment, the number of channels is not particularly limited to two. For example, if there is one general-purpose JBIG core channel in the present embodiment, decompression is performed by the single general-purpose JBIG core channel, switching the four color components (planes) in units of bands. In such a case, there is no processing of step S905 of FIG. 9, rather, decompression processing is performed, switching between the band data corresponding to the four color components in the processing of step S904. Also, configuration may be taken such that the CPU 103 decides the number of band decoding processes to be processed in parallel in the subsequent stage of step S903 of FIG. 9 in accordance with the number of general-purpose JBIG cores and the number of color components. For example, if there are three general-purpose JBIG core channels and the number of color components is six, two color components are allocated to one channel of the general-purpose JBIG core, and decompression processing is performed, switching between the two color components are in units of bands. At that time, in the subsequent stage of step S903 of FIG. 9, the first band decoding processing, the second band decoding processing, and third band decoding processing are executed in parallel. Also, the processing of FIG. 10 is executed for any of the first to third band decoding processing.

As described above, even in a case where the total number of compression/decompression processes that simultaneously operate on the image forming apparatus 100 exceeds the number of compression/decompression hardware resources that the image forming apparatus is equipped with, one compression/decompression hardware resource is applied to processing for a plurality of color components by time-division in units of bands. As a result, parallel operation of each process becomes possible, and it becomes possible to add functions to the image forming apparatus 100 without causing efficiency of the print processing to be severely reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-219127, filed Nov. 9, 2016, which is hereby incorporated by reference herein in its entirety.

What is claimed is:
1. An image forming apparatus, comprising:
   a spool memory configured to store compressed image data of a plurality of color components including a first color component and a second color component;
   a first controller, comprising at least one processor which executes instructions stored in at least one memory and/or at least one circuit, being configured to: cause a decompression unit to decompress the compressed image data stored in the spool memory; and
   a second controller, comprising at least one processor which executes instructions stored in at least one memory and/or at least one circuit, being configured to: receive the decompressed image data and perform image analysis processing on the received decompressed image data,
   wherein the first controller is configured to (a) cause the decompression unit to decompress first area data of the first color component of an area of a page, and then (b) cause the decompression unit to decompress second area data of the second color component of the area of the page, and then (c) cause the decompression unit to decompress third area data of the first color component of a next area of the page, and then (d) cause the decompression unit to decompress fourth area data of the second color component of the next area of the page, and
   wherein the second controller starts the image analysis processing based on receiving the decompressed first area data and the decompressed second area data before receiving the decompressed third area data and the decompressed fourth area data.

2. The image forming apparatus according to claim 1, further comprising:
a buffer memory configured to hold the decompressed image data,
wherein the second controller is configured to read and analyze the image data held in the buffer memory.

3. The image forming apparatus according to claim 2, wherein the image data corresponding to the plurality of color components of one area is held in the buffer memory, and the second controller reads and analyzes the image data.

4. The image forming apparatus according to claim 2, wherein the second controller is configured to perform a temperature adjustment of a fixing unit based on an application amount of the printing material obtained by the analysis, and to perform image forming processing based on the decompressed image data after the temperature adjustment.

5. The image forming apparatus according to claim 1, wherein the first controller is configured to respectively read and sequentially decompress image data stored in the spool memory,
wherein the decompressed first area data of the first color component and the decompressed second area data of the second color component are output via a first channel of a plurality of channels, and
wherein the decompressed third area data of the third color component and the decompressed fourth area data of the fourth color component are output via a second channel of the plurality of channels.

6. The image forming apparatus according to claim 5, wherein the plurality of color components include cyan, magenta, yellow, and black.

7. The image forming apparatus according to claim 5, wherein the decompression unit performs decompression processing by JBIG.

8. The image forming apparatus according to claim 1, wherein the image data corresponding to the plurality of color components stored in the spool memory is image data corresponding to a page.

9. The image forming apparatus according to claim 1, wherein the image data corresponding to the plurality of color components stored in the spool memory is image data to which halftone processing has been performed.

10. An image forming method that is executed in an image forming apparatus equipped with a spool memory for storing compressed image data of a plurality of color components including a first color component and a second color component, the method comprising:
causing a decompression unit to decompress the compressed image data stored in the spool memory; and
receiving the decompressed image data and performing image analysis processing on the received decompressed image data,
wherein the decompressing comprises (a) causing the decompression unit to decompress first area data of the first color component of an area of a page, and then (b) causing the decompression unit to decompress second area data of the second color component of the area of the page, and then (c) causing the decompression unit to decompress third area data of the first color component of a next area of the page, and then (d) causing the decompression unit to decompress fourth area data of the second color component of the next area of the page,
wherein the image analysis processing is started based on receiving the decompressed first area data and the decompressed second area data before receiving the decompressed third area data and the decompressed fourth area data.

11. The image forming apparatus according to claim 1, wherein the first controller is further configured to cause the decompression unit to output decompressed data of the first color component, decompressed data of the second color component, decompressed data of the third color component, and decompressed data of the fourth color component, to an image forming unit in parallel via a first channel for the first color component, a second channel for the second color component, a third channel for the third color component, and a fourth channel for the fourth color component, respectively,
wherein the first controller is further configured to cause the decompression unit to output the first area data of the first color component and the second area data of the second color component alternately via a fifth channel, and
wherein the first controller is further configured to cause the decompression unit to output the third area data of the third color component and the fourth area data of the fourth color component alternately via a sixth channel.

12. The image forming apparatus according to claim 1, wherein the image analysis processing is an analysis processing for performing a temperature adjustment of a fixing unit.

13. The image forming apparatus according to claim 1, wherein the first controller is further configured to (1) before the decompression of the next area of the page, (e) cause the decompression unit to decompress fifth area data of a third color component of the area of the page, and then (f) cause the decompression unit to decompress sixth area data of a fourth color component of the area of the page, and then (2) after the decompression of the area of the page, (g) cause the decompression unit to decompress seventh area data of the third color component of the next area of the page, and then (h) cause the decompression unit to decompress eighth area data of the fourth color component of the next area of the page,
wherein the decompression of the first color component and the decompression of the second color component are performed using one channel, and the decompression of the third color component and the decompression of the fourth component are performed using another channel.

14. The image forming apparatus according to claim 13, wherein (a) the decompression of the first color component and the decompression of the second color component and (b) the decompression of the third color component and the decompression of the fourth color component are performed in parallel between the one channel and the another channel.

15. The image forming apparatus according to claim 13, wherein the first controller is further configured to cause the decompression unit to decompress the compressed image data using four channels different from the one channel and the another channel,
wherein the decompression using the four channels is performed for printing and the decompression is performed in parallel between the four channels,
wherein the decompressed image data of the four channels is printed, and
wherein the second controller performs, as the image analysis processing, analysis processing for determining a fixing temperature on the received decompressed image data of the one channel and the another channel.

16. The image forming apparatus according to claim 13, wherein the image analysis processing is processing using data indicating a total toner amount of the first color component, the second color component, the third color component, and the fourth color component.

* * * * *